US007013337B2

(12) United States Patent
Defossé et al.

(10) Patent No.: US 7,013,337 B2
(45) Date of Patent: Mar. 14, 2006

(54) METHOD AND SYSTEM FOR THE OPTIMAL FORMATTING, REDUCTION AND COMPRESSION OF DEX/UCS DATA

(75) Inventors: Erin M. Defossé, Austin, TX (US); Arif Pathan, Austin, TX (US); James L. Chaput, Austin, TX (US)

(73) Assignee: Isochron, LLC, Austin, TX (US)

( * ) Notice: Subject to any disclaimer, the term of this patent is extended or adjusted under 35 U.S.C. 154(b) by 605 days.

(21) Appl. No.: 09/853,366

(22) Filed: May 11, 2001

(65) Prior Publication Data

US 2001/0042121 A1 Nov. 15, 2001

Related U.S. Application Data

(60) Provisional application No. 60/203,682, filed on May 12, 2000.

(51) Int. Cl.
*G06F 15/173* (2006.01)
*G06F 7/04* (2006.01)
*G06F 15/16* (2006.01)

(52) U.S. Cl. ...................... 709/224; 340/5.92; 709/247

(58) Field of Classification Search ................ 709/200, 709/217; 707/8; 714/38; 340/5.92, 5.82
See application file for complete search history.

(56) References Cited

U.S. PATENT DOCUMENTS

| | | | | |
|---|---|---|---|---|
| 3,784,737 | A | 1/1974 | Waehner | 178/6 |
| 4,369,442 | A | 1/1983 | Werth et al. | 340/825.35 |
| 4,412,292 | A | 10/1983 | Sedam et al. | 364/479 |
| 4,454,670 | A | 6/1984 | Bachmann et al. | 40/584 |
| 4,553,211 | A | 11/1985 | Kawasaki et al. | 364/479 |
| 4,661,862 | A | 4/1987 | Thompson | 358/335 |
| 4,677,565 | A | 6/1987 | Ogaki et al. | 364/479 |
| 4,766,548 | A | 8/1988 | Cedrone et al. | 364/479 |
| 4,850,009 | A | 7/1989 | Zook et al. | 379/96 |
| 4,926,996 | A | 5/1990 | Eglise et al. | 194/212 |
| 4,954,697 | A | 9/1990 | Kokubun et al. | 235/381 |

(Continued)

FOREIGN PATENT DOCUMENTS

DE 41 40 450 A1 6/1993

(Continued)

OTHER PUBLICATIONS

International Search Report PCT/US 03/37776, mailed May 17, 2004.

(Continued)

*Primary Examiner*—John Follansbee
*Assistant Examiner*—Philip Lee
(74) *Attorney, Agent, or Firm*—Baker Botts L.L.P.

(57) ABSTRACT

A method and system for communicating data between a network operations center and a remote device is described. Vending machine state information is communicated between a vending site and a network operations center using a delta scheme. A database, maintained by the network operations center, maintains a history of the activity of a variety of vending machines located at a variety of vending sites. To minimize the data needed to be transmitted between the vending site and the network operations center, the network operations center, in one embodiment, will request information from the vending site regarding the change in state of the various vending machines. The vending machines are responsible for restructuring a data block, calculating a delta for the change in state of the machine, applying a compression algorithm to the calculated delta and then transmitting the delta to the network operations center. Upon receipt of the delta, the network operations center can update the database by combining the delta with the previous state information stored in the database.

14 Claims, 11 Drawing Sheets

U.S. PATENT DOCUMENTS

| | | | | | |
|---|---|---|---|---|---|
| 5,029,098 | A | | 7/1991 | Lavasseur | 364/479 |
| 5,077,582 | A | | 12/1991 | Kravette et al. | 355/206 |
| 5,090,589 | A | | 2/1992 | Brandes et al. | 221/2 |
| 5,091,713 | A | | 2/1992 | Horne et al. | 340/541 |
| 5,117,407 | A | | 5/1992 | Vogel | 369/30 |
| 5,184,179 | A | | 2/1993 | Tarr et al. | 355/206 |
| 5,207,784 | A | | 5/1993 | Schwartzendruber | 221/6 |
| 5,239,480 | A | | 8/1993 | Huegel | 364/479 |
| 5,255,819 | A | | 10/1993 | Peckels | 222/1 |
| 5,282,127 | A | | 1/1994 | Mii | 364/479 |
| 5,337,253 | A | | 8/1994 | Berkovsky et al. | 364/479 |
| 5,339,250 | A | | 8/1994 | Durbin | 364/479 |
| 5,371,348 | A | | 12/1994 | Kumar et al. | 235/472 |
| 5,386,360 | A | | 1/1995 | Wilson et al. | 364/146 |
| 5,400,246 | A | | 3/1995 | Wilson et al. | 364/146 |
| 5,418,945 | A | * | 5/1995 | Carter et al. | 707/8 |
| 5,445,295 | A | | 8/1995 | Brown | 221/3 |
| 5,505,349 | A | | 4/1996 | Peckels | 222/641 |
| 5,507,411 | A | | 4/1996 | Peckels | 222/1 |
| 5,561,604 | A | | 10/1996 | Buckley et al. | 364/479.05 |
| 5,608,643 | A | | 3/1997 | Wichter et al. | 364/479.14 |
| 5,620,079 | A | | 4/1997 | Molbak | 194/217 |
| 5,649,308 | A | | 7/1997 | Andrews | 370/334 |
| 5,671,362 | A | | 9/1997 | Cowe et al. | 395/228 |
| 5,701,252 | A | | 12/1997 | Facchin et al. | 364/479 |
| 5,708,223 | A | | 1/1998 | Wyss | 73/865.9 |
| 5,787,149 | A | | 7/1998 | Yousefi et al. | 379/59 |
| 5,794,144 | A | | 8/1998 | Comer et al. | 455/426 |
| 5,805,997 | A | | 9/1998 | Farris | |
| 5,815,652 | A | | 9/1998 | Ote et al. | 395/183.07 |
| 5,818,603 | A | | 10/1998 | Motoyama | 358/296 |
| 5,822,216 | A | | 10/1998 | Satchell, Jr. et al. | 364/479.01 |
| 5,841,866 | A | | 11/1998 | Bruwer et al. | 380/23 |
| 5,842,597 | A | | 12/1998 | Kraus et al. | 221/150 R |
| 5,844,808 | A | | 12/1998 | Konsmo et al. | 364/479.14 |
| 5,850,187 | A | | 12/1998 | Carrender et al. | 340/825.54 |
| 5,860,362 | A | | 1/1999 | Smith | 101/494 |
| 5,862,517 | A | | 1/1999 | Honey et al. | |
| 5,867,688 | A | | 2/1999 | Simmon et al. | 395/500 |
| 5,892,758 | A | | 4/1999 | Argyoudis | |
| 5,898,904 | A | | 4/1999 | Wang | 455/31.3 |
| 5,905,442 | A | | 5/1999 | Mosebrook et al. | |
| 5,905,882 | A | | 5/1999 | Sakagami et al. | |
| 5,907,491 | A | | 5/1999 | Canada et al. | 364/468.15 |
| 5,909,183 | A | | 6/1999 | Borgstahl et al. | 340/825.22 |
| 5,915,207 | A | | 6/1999 | Dao et al. | 455/9 |
| 5,918,213 | A | | 6/1999 | Bernard et al. | 705/26 |
| 5,924,081 | A | | 7/1999 | Ostendorf et al. | 705/30 |
| 5,930,770 | A | | 7/1999 | Edgar | 705/28 |
| 5,930,771 | A | | 7/1999 | Stapp | 705/28 |
| 5,941,363 | A | | 8/1999 | Partyka et al. | 194/217 |
| 5,943,042 | A | | 8/1999 | Siio | 345/172 |
| 5,949,779 | A | | 9/1999 | Mostafa et al. | |
| 5,956,487 | A | | 9/1999 | Venkatraman et al. | |
| 5,957,262 | A | | 9/1999 | Molbak et al. | 194/200 |
| 5,959,536 | A | | 9/1999 | Chambers et al. | |
| 5,959,869 | A | | 9/1999 | Miller et al. | 364/479.1 |
| 5,979,757 | A | | 11/1999 | Tracy et al. | 235/383 |
| 5,982,325 | A | | 11/1999 | Thornton et al. | 342/357.07 |
| 5,982,652 | A | | 11/1999 | Simonelli et al. | 363/142 |
| 5,986,219 | A | | 11/1999 | Carroll et al. | 177/1 |
| 5,991,749 | A | | 11/1999 | Morrill, Jr. | 705/44 |
| 5,997,170 | A | | 12/1999 | Brodbeck | 364/479.06 |
| 6,003,070 | A | | 12/1999 | Frantz | |
| 6,005,850 | A | | 12/1999 | Moura et al. | 370/282 |
| 6,012,041 | A | | 1/2000 | Brewer et al. | 705/28 |
| 6,021,324 | A | | 2/2000 | Sizer, II et al. | |
| 6,021,437 | A | | 2/2000 | Chen et al. | 709/224 |
| 6,029,143 | A | | 2/2000 | Mosher et al. | 705/28 |
| 6,032,202 | A | | 2/2000 | Lea et al. | |
| 6,038,491 | A | | 3/2000 | McGarry et al. | 700/231 |
| 6,052,667 | A | | 4/2000 | Walker et al. | 705/15 |
| 6,052,750 | A | | 4/2000 | Lea | 710/72 |
| 6,056,194 | A | | 5/2000 | Kolls | 235/381 |
| 6,057,758 | A | | 5/2000 | Dempsey et al. | 340/539 |
| 6,061,668 | A | | 5/2000 | Sharrow | 705/400 |
| 6,068,305 | A | | 5/2000 | Myers et al. | 292/201 |
| 6,070,070 | A | | 5/2000 | Ladue | 455/419 |
| 6,072,521 | A | | 6/2000 | Harrison et al. | 348/12 |
| 6,084,528 | A | | 7/2000 | Beach et al. | 340/825.35 |
| 6,085,888 | A | | 7/2000 | Tedesco et al. | 194/217 |
| 6,119,100 | A | | 9/2000 | Walker et al. | 705/20 |
| 6,124,800 | A | | 9/2000 | Beard et al. | 340/825.35 |
| 6,131,399 | A | | 10/2000 | Hall | 62/127 |
| 6,161,059 | A | | 12/2000 | Tedesco et al. | 700/232 |
| 6,163,811 | A | * | 12/2000 | Porter | 709/247 |
| 6,181,981 | B1 | | 1/2001 | Varga et al. | 700/236 |
| 6,185,545 | B1 | | 2/2001 | Resnick et al. | 705/40 |
| 6,199,753 | B1 | | 3/2001 | Tracy et al. | 235/375 |
| 6,230,150 | B1 | | 5/2001 | Walker et al. | |
| 6,272,395 | B1 | | 8/2001 | Brodbeck | 700/236 |
| 6,289,453 | B1 | | 9/2001 | Walker et al. | 713/175 |
| 6,304,895 | B1 | | 10/2001 | Schneider et al. | 709/203 |
| 6,324,520 | B1 | | 11/2001 | Walker et al. | 705/16 |
| 6,338,149 | B1 | * | 1/2002 | Ciccone et al. | 714/38 |
| 6,339,731 | B1 | | 1/2002 | Morris et al. | 700/236 |
| 6,341,271 | B1 | | 1/2002 | Salvo et al. | 705/28 |
| 6,356,794 | B1 | | 3/2002 | Perin, Jr. et al. | 700/78 |
| 6,385,772 | B1 | | 5/2002 | Courtney | 725/105 |
| 6,437,692 | B1 | | 8/2002 | Petite et al. | 340/540 |
| 6,442,532 | B1 | | 8/2002 | Kawan | 705/35 |
| 6,457,038 | B1 | * | 9/2002 | Defosse | 709/200 |
| 6,462,644 | B1 | * | 10/2002 | Howell et al. | 340/5.92 |
| 6,467,685 | B1 | | 10/2002 | Teicher | 235/379 |
| 6,502,131 | B1 | | 12/2002 | Vaid et al. | 709/224 |
| 6,505,095 | B1 | | 1/2003 | Kolls | 700/244 |
| 6,525,644 | B1 | | 2/2003 | Stillwagon | 340/5.61 |
| 6,550,672 | B1 | | 4/2003 | Tracy et al. | 235/383 |
| 6,553,336 | B1 | | 4/2003 | Johnson et al. | 702/188 |
| 6,581,986 | B1 | | 6/2003 | Roatis et al. | 292/199 |
| 6,584,309 | B1 | | 6/2003 | Whigham | 455/414 |
| 6,604,086 | B1 | | 8/2003 | Kolls | 705/14 |
| 6,604,087 | B1 | | 8/2003 | Kolls | 705/14 |
| 6,606,602 | B1 | | 8/2003 | Kolls | 705/14 |
| 6,609,113 | B1 | | 8/2003 | O'Leary et al. | 705/39 |
| 6,704,714 | B1 | | 3/2004 | O'Leary et al. | 705/39 |
| 6,712,266 | B1 | | 3/2004 | Bartley et al. | 235/380 |
| 6,714,977 | B1 | | 3/2004 | Fowler et al. | 709/224 |
| 6,738,811 | B1 | | 5/2004 | Liang | 709/224 |
| 6,748,296 | B1 | | 6/2004 | Banerjee et al. | 700/241 |
| 6,772,048 | B1 | | 8/2004 | Leibu et al. | 700/241 |
| 6,837,436 | B1 | | 1/2005 | Swartz et al. | 235/472.02 |
| 6,867,685 | B1 | | 3/2005 | Stillwagon | 340/5.64 |
| 6,900,720 | B1 | | 5/2005 | Denison et al. | 340/5.9 |
| 2001/0002210 | A1 | | 5/2001 | Petite | 379/155 |
| 2002/0024420 | A1 | | 2/2002 | Ayala et al. | 340/5.61 |
| 2002/0169539 | A1 | | 11/2002 | Menard et al. | 701/200 |
| 2003/0013482 | A1 | | 1/2003 | Brankovic | 455/553 |
| 2003/0128101 | A1 | | 7/2003 | Long | 340/5.26 |

FOREIGN PATENT DOCUMENTS

| | | | |
|---|---|---|---|
| EP | 0 564 736 | A1 | 10/1993 |
| EP | 0 602 787 | A2 | 10/1993 |
| EP | 0 817 138 | A1 | 1/1998 |
| EP | 0 999 529 | | 5/2000 |
| EP | 1096408 | | 5/2001 |
| FR | 2 744 545 | | 2/1996 |
| FR | 2 755776 | | 5/1998 |
| JP | 6296335 | A2 | 10/1994 |
| JP | 9198172 | A2 | 7/1997 |
| WO | WO 89/07807 | | 8/1989 |
| WO | WO 95/04333 | | 2/1995 |
| WO | WO 95/05609 | | 2/1995 |

| | | |
|---|---|---|
| WO | WO 97/09667 | 3/1997 |
| WO | WO 98/45779 | 10/1998 |
| WO | WO 99/23620 | 5/1999 |
| WO | WO 99/27465 | 6/1999 |
| WO | WO 99/36751 | 7/1999 |
| WO | WO 99/48065 | 9/1999 |
| WO | WO 00/04475 | 1/2000 |
| WO | WO 00/04476 | 1/2000 |
| WO | WO 00/31701 | 6/2000 |
| WO | 02/19281 | 3/2002 |

OTHER PUBLICATIONS

International Preliminary Examination Report PCT/US01/31381, Mailed May 12, 2003.

International Search Report for PCT/US99/05983 7 pages (064814.0107), Mailed Aug. 13, 1999.

International Search Report PCT/US01/16749 (064814.0145), Mailed Dec. 20, 2001.

International Search Report PCT/US01/15522, Mailed May 16, 2002.

Skywire Provides Details of Wireless 'VendView' System; Vending Times, Sep., 1994.

Skywire allows vendor tracking of pop stock and sales details; RCR, vol. 14, No. 17, Sep. 4, 1995.

Left high and dry? Sold-out machine sends for Cokes; Nashville Banner, Aug. 16, 1995.

Leitch, Carolyn, "Coke machines signal when it's time for a refill"; The Globe & Mail, Toronto, Ontario, Aug. 30, 1995.

Wireless Communications Forum; vol. III, No 1 pp. 25-30, Apr. 1995.

Meet the Smart Coke Machine; The Sacramento Bee Business Technology; Wednesday, Aug. 30, 1995.

International Search Report PCT/US 01/31381 (064814.0209), Mailed Nov. 7, 2002.

International Search Report PCT US 01/41640, Mailed Aug. 21, 2002.

NetBotz Internet Article, "Welcome to Netbotz" at internet <http:www.netbotz.com>, Printed May 10, 2000.

American Power Conversion Internet Article, "Lightning Advisor", at internet, <http://lightning.apcc.com>, Printed May 10, 2000.

American Products Internet Article, "Product Information", at internet, <http://www.apc.com>, Printed May 10, 2000.

International Search Report for PCT/US 01/15522 mailed May 16, 2002.

* cited by examiner

| SPECIAL FIELD | 305 FIELDS THAT DO NOT CHANGE FREQUENTLY | FIELDS THAT CHANGE FREQUENTLY 320 | NON-STANDARD FIELDS BLOCK |
|---|---|---|---|
| (0) NSL*12 | (1) DXS*9259630007*VA*V1/1*1** 310 | (46) VA1*100820*1935*100470-1922 315 | (84) MA5*ERROR*ACLO |
| | (2) SE*60*0001 | (47) CA2* | (85) PA5*ColNum |
| | (3) DXE*1*1 | (48) CA3*135040*38015*38225*588*135545*38290*38255*590 | |
| | (4) ST*001*0001 | (49) CA4*35975*1605*36130*1605 | |
| | (5) ID1*1296170514*GIII-VENDOR 67015-6*6*** | (50) CA6* | |
| | (6) ID4*2*1* | (51) CA17* | |
| | (7) CA1* | (52) DA2*0*0*0*0 | |
| | (8) BA1*CAI000489604085*BA30B -2*7**ASSET | (53) TA2*0*0*0*0 | |
| | (9) DA1* | (54) PA2*299*14755*296*14680 | |
| | (10) LS*0100 | (55) PA2*399*19795*397*19745 | |
| | (11) PA1*1*35* | (56) PA2*241*12385*240*12360 | |
| | (12) PA1*2*35* | (57) PA2*231*11010*230*10985 | |
| | (13) PA1*3*35* | (58) PA2*139*7605*138*7580 | |
| | (14) PA1*4*35* | (59) PA2*380*19875*379*19850 | |
| | (15) PAI*5*35* | (60) PA2*125*7310*123*7235 | |
| | (16) PAI*6*35* | (61) PA2*71*4560*70*4535 | |
| | (17) PA1*7*35* | (62) PA2*50*3525*49*3500 | |
| | (18) PA1*8*35* | (63) PA2*0*0*0*0 | |
| | (19) PA1*9*35* | (64) PA2*0*0*0*0 | |
| | (20) PA1*10*35* | (65) PA2*0*0*0*0 | |
| | (21) PA1*11*35* | (66) EA2*DO*174 | |
| | (22) PA1*12*35* | (67) EA3*5 | |

*FIG. 3A*

TO FIG. 3B

*FIG. 3B*

FROM FIG. 3A

(23) LE*0100
(24) MA5*BAUD*9600
(25) MA5*SWITCH*UNLOCK*1**7
(26) MA5*TUBE2*
(27) MA5*PACKAGE*
(28) MA5*STATUS*
(29) MA5*CCOC*
(30) MA5*PREV*
(31) MA5*LANG*
(32) MA5*LITE*
(33) MA5*RFRG*
(34) MA5*BLC1*
(35) MA5*BLC2*
(36) MA5*DISC*
(37) MA5*OVER*
(38) MA5*SDEP*
(39) SD1*000000000000
(40) EA2*CR**1
(41) VA2*0*14*0*14
(42) CA5*
(43) CA9*
(44) VA3*
(45) EA7*46*53

(68) G85*4292
(69) MA5*TUBE1*2*65*105*75
(70) MA5*SEL0*1,2*277*319
(71) MA5*SEL1*3,4*379*434
(72) MA5*SEL2*5,6*209*219
(73) MA5*SEL3*7*224*270
(74) MA5*SEL4*8*109*137
(75) MA5*SEL5*9*372*465
(76) MA5*SEL6*10*70*84
(77) MA5*SEL7*11*53*57
(78) MA5*SEL8*12*32*37
(79) MA5*SEL9-*0*0
(80) MA5*SEL10**0*0
(81) MA5*SEL11**0*0
(82) MA5*SEL12**0*0
(83) MA5*TIME*

METHOD AND SYSTEM FOR THE OPTIMAL FORMATTING, REDUCTION AND COMPRESSION OF DEX/UCS DATA

CROSS REFERENCE TO RELATED APPLICATION

This application claims priority from U.S. Provisional Patent Application Ser. No. 60/203,682, filed May 12, 2000, and entitled "METHOD AND SYSTEM FOR THE OPTIMAL FORMATTING, REDUCTION AND COMPRESSION OF DEX/UCS DATA."

TECHNICAL FIELD

The present invention relates generally to data formatting, reduction and compression. More particularly, the present invention relates to a data formatting, reduction and compression method and system for use in wireless and/or wireline communication networks.

BACKGROUND OF THE INVENTION

Over the past decade, vending machine manufacturers have developed new and innovative vending equipment in response to market needs and vending operator demands. These innovations have been, for the most part, adopted by the beverage vending industry. This trend has been influenced by the accelerating rate of technological innovation in the electronic and electro-mechanical component industry. The availability of new technologies has given vending machine manufacturers the tools to address many of the requirements of vending operators. Advances in electronics are now enabling the use of computer controls and data acquisition systems directly inside the vending machine. Some of the latest vending machines now make it possible for vending machine operators to download sales, inventory, and machine health information on-site onto portable computers or to transmit the vending machine information to a central operations location.

SUMMARY OF THE INVENTION

In accordance with the teachings of the present invention, a system and method are provided to allow users to extend their corporate enterprise systems into the field using wireless data technologies. The system and method offer information solutions for a wide variety of e-commerce services. One aspect of the present invention is based on an application services platform or network operations center (NOC) upon which users host their wireless-enabled enterprise applications. The NOC manages the complexities of the wireless data realm while providing users with seamless access to their field data and enabling the integration of hand held wireless devices into the system. The present invention may be efficiently used in vertical industries such as cold drink vending, fast food restaurants (fountain drinks), ice merchandising, printing and imaging. Horizontal industries which may benefit from the teachings of the present invention include refrigeration, field service, and end-customer enablement using wireless data.

The present invention is particularly useful as a wireless data solution for vending machines that makes use of narrowband wireless networks and Internet-based e-commerce application services (using Java, XML, WAP, etc.) to enable vending operators to improve their sales and reduce their operational costs.

Accordingly, a method for efficiently and cost effectively communicating data between a network operations center and a remote device is provided. The method may involve transmitting a request for data to at least one remote device. Upon receipt of the request for data by the remote device, a current state for the remote device is preferably established. After accessing a previous state for the remote device, a delta value is then preferably calculated between the current state and the previous state for the remote device. The delta data is then written to a device response and the device response is sent to the network operations center for database updating. In a further embodiment, the delta data is compressed before transmission to the network operations center.

The present invention also provides a method and system for communicating information between a network operations center and a remote device. This method of communication preferably begins by transmitting at least one request for information to the remote device. Upon receipt of the request, records are selected from a data block based upon the request. The selected records are then preferably restructured according to a template prior to transmitting the restructured records to the network operations center. In a further embodiment, the method may also compress a delta value calculated between a current set of restructured records and a previously stored set of restructured records.

In another embodiment, the present invention provides a method for communicating information between a network operations center and a remote device. In this "call-in" mode, the method preferably includes selecting records from a data block communicatively coupled to the device. The selected records are then preferably restructured according to a template and a delta is calculated between the restructured records and a stored set of records. Once the delta has been calculated, the delta is preferably transmitted to the network operations center.

In yet another embodiment, the present invention provides a system for acquiring data at a remote device and communicating between a network operations center and the remote device. In this preferred "call-in" system, the remote device is preferably operable to establish communications with the network operations center. The remote device is preferably further operable to select at least one record from a data block communicatively coupled to the device. Upon selection of the record, the remote device is preferably operable to restructure the record according to a template available to the remote device. Once the record has been restructured, the remote device preferably calculates a delta between the delta and a stored set of records. The remote device then preferably transmits the delta to the network operations center via a network.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIGS. 3A–3B illustrates a template form for restructuring a DEX file according to one embodiment of the present invention;

DETAILED DESCRIPTION OF THE INVENTION

Figure 1:
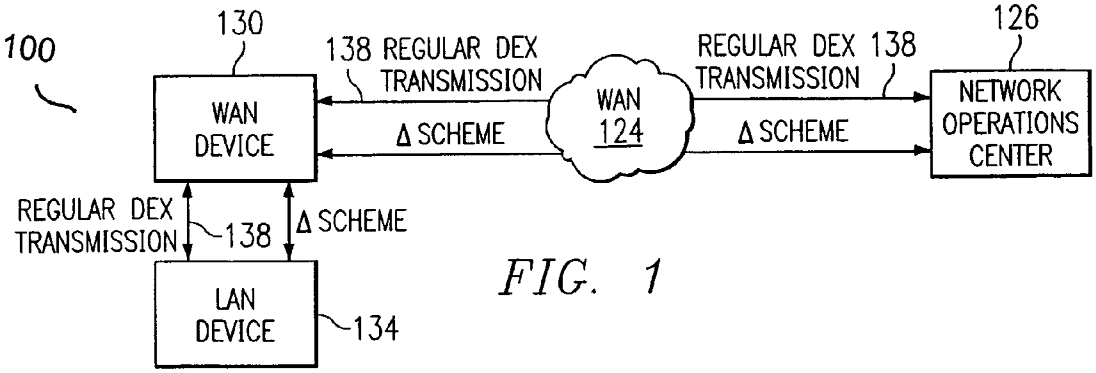
FIG. 1 is a block diagram of a system for communicating between a remote device and a network operations center incorporating teachings of the present invention.

Preferred embodiments of the invention and its advantages are best understood by referring to FIGS. 1–10 of the drawings, like numerals being used for like and corresponding parts of the various drawings.

Variable Descriptions, Values and Definitions

The following variable descriptions, values and definitions will be used to describe various features of the present invention.

Refill-data—Data stored in the Refill-data portion of a getStructuredDexData response. It could be $State_{Refill}$, delta (Δ) data between $State_{Refill}$ and $State_{Refill\text{-}Old}$ or other refill related information associated with the current state of a device.

Current-data—Data stored in the Current-data portion of a getStructuredDexData response. It could be $State_{Current}$, or delta (Δ) data between $State_{Current}$ and $State_{Refill\text{-}old}$ or other information related to the current state of a device.

$State_{Refill\text{-}database}$—The refill state that is stored in the Network Operations Center (NOC) database. For a new device entry in the database, this value is preferably null (0). In the case where the NOC database has the latest refill state, $State_{Refill\text{-}database}=State_{Refill}$. In the case where the NOC database does not have the latest refill state, $State_{Refill\text{-}database}=State_{Refill\text{-}old}$.

$State_{Refill}$—The most current refill state stored on the remote data acquisition and transmission device (RDATD). If the Controller on the RDATD has only been reset once, $State_{Refill}=State_{Refill\text{-}old}$.

$State_{Refill\text{-}old}$—The refill state previous to the current refill state, i.e., $State_{Refill}$, stored on the RDATD. If the Controller has only been reset once $State_{Refill}=State_{Refill\text{-}old}$. $State_{Refill\text{-}Old}$ is also used as a reference state variable for a remote device.

$State_{Current}$—The complete current state of a RDATD controller.

$DataLength_{Current}$—Length of the Current-data block in a getStructuredDexData response:

- If $DataLength_{Current}$=0, there is no data for the current state.
- If $DataLength_{Current}$=FFFF, there is no change in current state since last retrieved.
- If $DataLength_{Current}$=xxx, the information contained in the Current-data block of the getStructuredDexData response is the actual length of the Current-data block.

$DataLength_{Refill}$—Length of the Refill-data block in a getStructuredDexData response.

- If $DataLength_{Refill}$=0, there is no data for the current state.
- If $DataLength_{Refill}$=FFFF, there is no change in Refill-data since last retrieved.
- If $DataLength_{Refill}$=xxx, the information contained in the Refill-data portion of the getStructuredDexData response is the actual length of the Refill-data block.

$CRC_{Refill\text{-}database}$—Cyclic Redundancy Check Value (CRC) for the Refill-data that was last received by the NOC and that is stored in the NOC database. For a new device, a value of zero (0) is preferably stored in the database for this field.

$CRC_{Refill}$—the CRC for $State_{Refill}$, cached on the RDATD.

$CRC_{Refill\text{-}old}$—the CRC for $State_{Refill\text{-}old}$, cached on the RDATD.

$\Delta_{Refill}=State_{Refill}-State_{Refill\text{-}old}$.

$\Delta_{Current}=State_{Current}-State_{Refill}$.

The term "wire-line transmissions" is used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present invention over electrical power lines, electrical power distribution systems, building electrical wiring, conventional telephone lines, ethernet cabling (10baseT, 100baseT, etc.), coaxial cables, etc.

The term "wireless transmissions" is used to refer to all types of electromagnetic communications which do not require a wire, cable, or other types of conduits. Examples of wireless transmissions for use in local area networks (LAN) include, but are not limited to, radio frequencies, such as the 900 MHz and 2.4 GHz bands, infra-red, and laser. Examples of wireless transmissions for use in wide area networks (WAN) include, but are not limited to, radio frequencies, such as the 800 MHz, 900 MHz, and 1.9 GHz ranges, infra-red, and laser.

FIG. 1 is a block diagram of a system for communicating between a remote device and a network operations center incorporating teachings of the present invention. System 100 of FIG. 1 preferably includes network operations center 126 communicatively coupled to wide area network (WAN) device 130 and local area network (LAN) device 134 via wide area network 124. Wide area network 124 can be either a wireless or a wire-line network.

System 100 can preferably utilize at least two different communication schemes for communicating between the network operations center 126 and WAN device 130 and/or LAN device 134. One communication scheme is the DEX/UCS protocol of data transfer as indicated at 138. The second communication scheme is a delta scheme for transmitting data from LAN device 134 and WAN device 130 to NOC 126 and vice versa as indicated at 142. The delta scheme of communication reduces the amount of data necessary to provide complete updated information to NOC 126 and database 230.

The delta scheme of the present invention utilizes a getStructuredDexData command to achieve this reduction in transmitted information. The getStructuredDexData command preferably selects records specified in a template from an original DEX/UCS data block associated with a remote device, restructures the records in a preferred order, and calculates a delta (Δ) or difference between a previous state and the current state of the remote device. Instead of sending the entire restructured data block, only the delta (Δ) is transmitted to NOC 126. In one embodiment, the delta is compressed, using a conventional compression algorithm such as zip, gzip, etc., before transmitting the delta to the NOC 126. NOC 126 can recreate the current state of the remote device from delta (Δ) and values for a previous state that are stored in a database. The information associated with the various states of the remote device can include inventory levels, number of vends, condition of device hardware, as well as any other characteristic capable of being monitored and contained in the original DEX/UCS data block.

Figure 2:
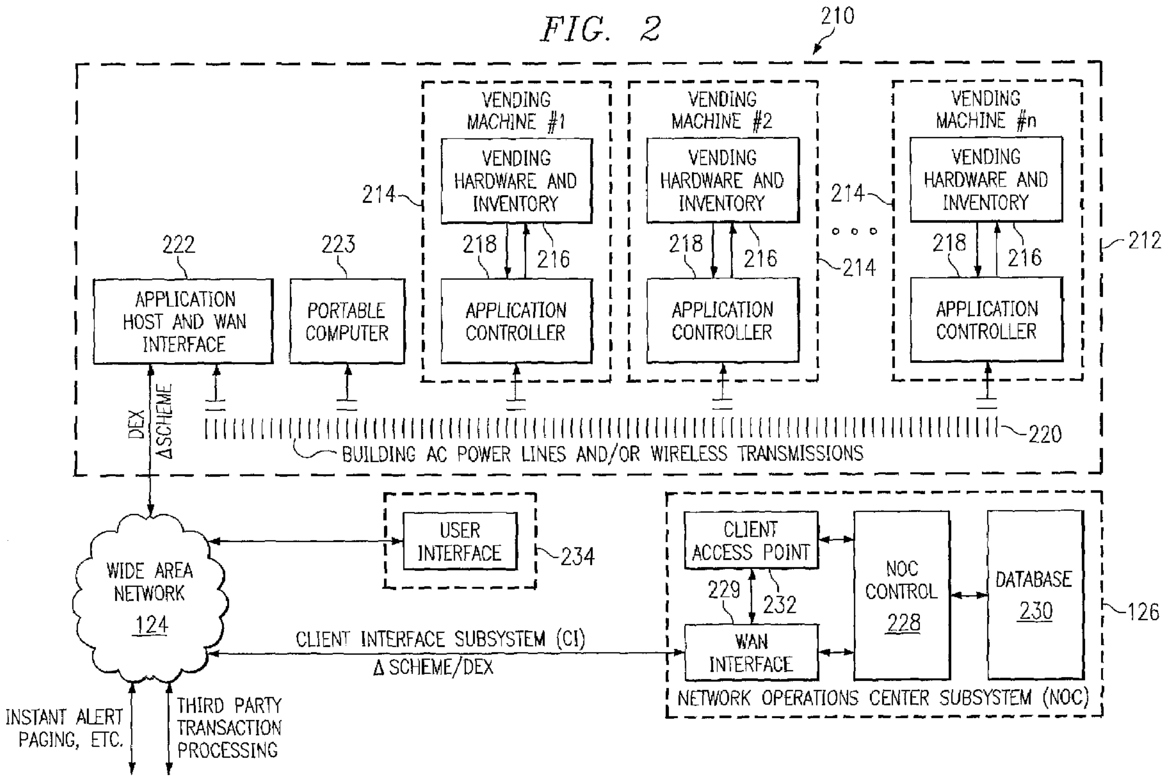
FIG. 2 is a block diagram of one embodiment of a remote data acquisition system for vending machines according to the present invention.

FIG. 2 is a functional block diagram of one embodiment of a remote data acquisition system for vending machines, indicated generally at 210, according to the present invention. In general, system 210 of FIG. 2 communicates information from a vending site 212 externally over a wide area wireless or wire-line network and internally over a local area wireless or wire-line network. As shown, the local area network at vending site 212 can be referred to as a device interrogation LAN subsystem (DIL). Vending site 212 may include only one vending machine 214 or a plurality of vending machines 214. Each vending machine 214 may include vending hardware (not expressly illustrated) and inventory 216 for performing vending functions and electronically tracking some vending information. Vending machines 214 may provide various types of products to customers such as soft drinks, snacks, etc.

According to the present invention, each vending machine 214 may include an application controller 218 coupled to and interfacing with vending hardware and inventory 216. Many vending machines 214 are equipped with electronics for controlling vending operations as well as tracking some vending events such as money received, change given and number of vends from each slot. Application controllers 218 can communicate with such embedded electronics as well as be equipped to directly sense other vending events and vending equipment parameters (e.g. compressor performance). Application controllers 218 can also communicate with one another and the application host 222 via onboard transceivers using wire-line or wireless transmissions. According to the present invention, either the application controller 218 or the application host 222 can be configured to process the getStructuredDexData request or command, to restructure a DEX/UCS data block or to calculate delta (Δ) values.

Together, application controllers 218 and application host 222 form a LAN supported by the wireline and/or wireless transmissions 220. In addition, application controllers 218 can also act as repeaters in case application host 222 cannot directly communicate with a particular application controller 218 while another application controller 218, which does have an established communication link with application host 222, can directly communicate.

Application host 222 acquires data captured by application controllers 218 and, preferably using the delta scheme of the present invention, can package and communicate that data across an external network 124 using a wide area network (WAN) interface. Application host 222 can be installed together with application controller 218 inside a vending machine or housed separately in another location. In the event that the application host 222 is placed inside a vending machine together with an application controller 218, it is possible to share some of the electronic components between them, the LAN transceiver for example, in order to reduce the cost of the hardware. In this case, the application host 222 and application controller 218 inside the same vending machine, would preferably communicate with each other over a hardwired interface between the two components. Alternatively, the application host 222 and application controller 218 can be designed to be a single integrated component within a vending machine. Furthermore, an application host 222 can be used whose function preferably consists of monitoring the application controllers 218. For example, such an application host 222 could take the form of a hand-held portable computer 223 to be carried by service or delivery personnel in order to query the application controllers 218 without having to interact via the WAN interface 229. In one embodiment, application host 222 and/or application controller 218 may be used to perform the preferred functions associated with the automated or "Call-In" mode of operation mentioned above.

The WAN interface 229 can be implemented in a number of ways. In particular, WAN interface 229 is designed to support a wide area network 124 that can be implemented via wire-line or wireless transmissions. If a wireless narrowband PCS paging network is used to implement the WAN, messages from application host 222 can be communicated as digital messages through the paging network, stored and delivered by the network carrier to the NOC using, for example, a secure Internet connection.

As shown in FIG. 2, a network operations center (NOC) 126 communicates with one or more vending sites 212 across wide area network 124 using the delta scheme of the present invention. As mentioned, in one implementation, network operations center 126 can access information transmitted by application hosts 222 at vending sites 212 using the network carrier's infrastructure. In the embodiment of FIG. 2, network operations center 126 includes a NOC control 228 that communicates with wide area network 124 through a WAN interface 229. NOC control 228 can receive data acquired from and transmit data to vending sites 212, process the data and store the data into database 230. NOC control 228 can also perform instant alert paging, direct dial alarms and other functions to provide real time notification to a vending operator upon the occurrence of certain events (e.g., out-of-stock, power outage, vandalism, etc.). NOC control 228 can also provide third party transaction processing such as allowing queries on database 230. The WAN interface 229 between NOC control 228 and the wide area network 124 can be implemented through the use of either wire-line or wireless transmissions.

At network operations center 126, a client access point 232 provides access from a client interface subsystem (CI) 234 across external network 224. In one implementation, client access point 232 can be a web-based interface allowing user access from a client computer across a network such as the Internet. Other implementations include providing a direct-dial connection between client interface subsystem 234 and client access point 232. Once connected, a user can use client interface subsystem 234 to obtain information from database 230 based upon data acquired from vending sites 212. Further, users can be provided with extended services such as trend information developed by mining and analyzing database 230.

According to the present invention, system 210 of FIG. 2 combines a number of technologies to provide technical advantages in the area of vending machine management, to reduce various operational costs and to overcome existing network traffic problems with conventional remote data acquisition systems for vending machines. As mentioned above, some conventional remote data acquisition systems employ a point-to-point wireless communication link to retrieve information from and send information to a plurality of remote devices. Further, wide-area networks (WAN) are often formed from a plurality of local area networks (LANs), and such LANs are often interconnected using a wire-line or wireless data transmission system. In other technical areas, wire-line and wireless transceivers have been used for local area network communication.

Delta scheme 142 of the present invention enables network data volume and communication time between NOC 126 and remote devices 130 and 134 to be minimized. Delta scheme 142 functions to minimize the amount of information necessary to be communicated between NOC 126 and devices 130 and 134 such that the complete state information of each device is maintained at NOC 126.

FIGS. 3A–3B illustrate one embodiment of the fields of a DEX/UCS block which has been restructured in response to a getStructuredDexData request. As illustrated in FIGS. 3A–3B, the DEX/UCS data block is preferably sectioned off into four categories. Category 305 preferably includes special fields, category 310 preferably includes fields that do not change frequently while category 315 preferably contains the fields that are likely to change frequently. Category 320 preferably includes the non-standard fields of a DEX/UCS data block. Restructuring the DEX/UCS data block allows for very high compression ratios to be achieved after the delta is calculated. These compression ratios may not be achievable without the restructuring of the DEX/UCS data block.

Software (not expressly shown) incorporating teachings of the present invention running on a device end, such as software running on application controller 218 or application host 222, will restructure the DEX/UCS data block according to a template framework, such as that illustrated in FIGS. 3A–3B, and by following a preferred set of rules. The preferred set of rules includes: to calculate $\Delta_{10}$, $state_0$ is subtracted from $state_1$; if the DEX/UCS data block obtained from the RDATD controller does not contain a particular record type expected in the template, a character, such as a carriage return character (<CR>), is written to the restructured data block; if the data block from the RDATD controller contains a particular record type that is not expected in the template, it is ignored; for each record, only the fields of interest are considered (For example, for the record "PA2*9888*543660*9882*543510" we may only need to send information "9888" and "543660," making our desired record "PA2*9888*543660."); for records that match, a <CR> is written to the restructured block; for records that don't match, the record identifier is skipped and a delta is calculated only for the remaining portion, (For example, for the two records "MA5*SEL1*1,7*9821,10086" and "MA5*SEL1*1,7*5696*5845," the delta is calculated for "1,7*9821*10086" and "1,7*5696*5845" portions only.); the delta is calculated on a per field basis, i.e., the fields separated by "*'s"; if a required field is absent in the DEX data block received from the RDATD controller, the restructured data block will have two contiguous "*'s" for that field; if all the bytes in the delta for a field are binary 0's (zeroes), the delta is considered to be empty and there is no delta data for that field to be written, (In this situation, there will be only two "*'s" in the record with no field value in between.); each such delta, except for the last record in line, is written to the restructured block followed by a "*"; the last record written to the restructured data block is followed by a <CR>; for fields that are not of equal length, e.g., "5845" and "10086," the shorter field is padded at the end with the appropriate number of 0's (zeroes) to make it equal in length to the longer field, (A delta is preferably calculated on two equal length fields.); since blank characters are allowed in the DEX/UCS data block, binary zeroes (0's) will be used for padding a shorter field to make it equal in length to the longer field, (This helps in reconstructing $state_1$ from $state_0$ and delta.); instead of "1*55", it is desirable to minimize the size of the restructured data block and use "1*55" instead; by using 0 (zero) when adding the $state_0$ byte and the delta byte equals 0 (zero) we discard that byte since it was used for padding; and non-standard records are written to the very end of the restructured data block without calculating a delta.

FIGS. 4–8 illustrate one example of preferred steps processed by NOC 126 and device 400, such as a remote vending unit 214, during various getStructuredDexData requests. In FIGS. 4–8, the DEX data block is restructured at the remote device upon receipt of the getStructuredDexData request. Restructuring the DEX/UCS data block can also occur at other times during the processing of the getStructuredDexData request. In addition to calculating a delta in response to receipt of a getStructuredDexData request, a remote device may be configured to operate in an automated mode. This automated or "Call-In" mode is preferably configured such that a delta is calculated, generally as defined below, in response to a predetermined event, such as at a certain time, a threshold number of transactions, etc., and then transmitted to NOC 126.

Figure 4:
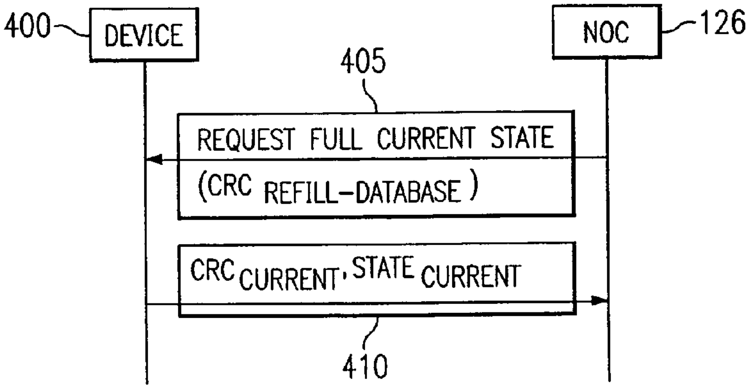
FIGS. 4–8 illustrate various scenarios of data transmission and processing according to one embodiment of the present invention.
Figure 6:
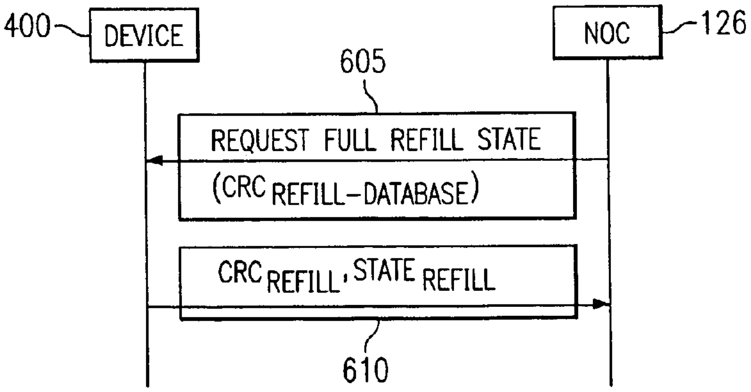

FIG. 4 illustrates the processing and transmissions which occur when NOC 126 transmits a getStructuredDexData request for $State_{Current}$ or the complete current state of device 400. As illustrated in FIG. 4, NOC 126 transmits a getStructuredDexData request to get an update of the $State_{Current}$ of device 400. Included in the getStructuredDexData request for a $State_{Current}$ update, is the check value $CRC_{Refill\text{-}Database}$ as indicated at 405. In response to receipt of the getStructuredDexData request for a $State_{Current}$ update, device 400 preferably writes $CRC_{Current}$ and $State_{Current}$ to a device response and then transmits the device response to NOC 126 as indicated at 410. In one embodiment, the information written to the device response is compressed prior to being written. Upon receipt of the device response containing $CRC_{Current}$ and $State_{Current}$, NOC 126 preferably recreates a current state from values stored in database 230 and the values of $CRC_{Current}$ and $State_{Current}$ provided in the device response.

Figure 5A:
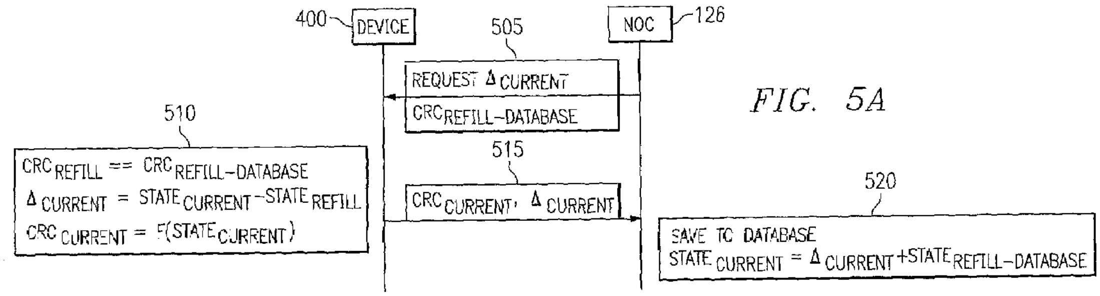
Figure 5B:
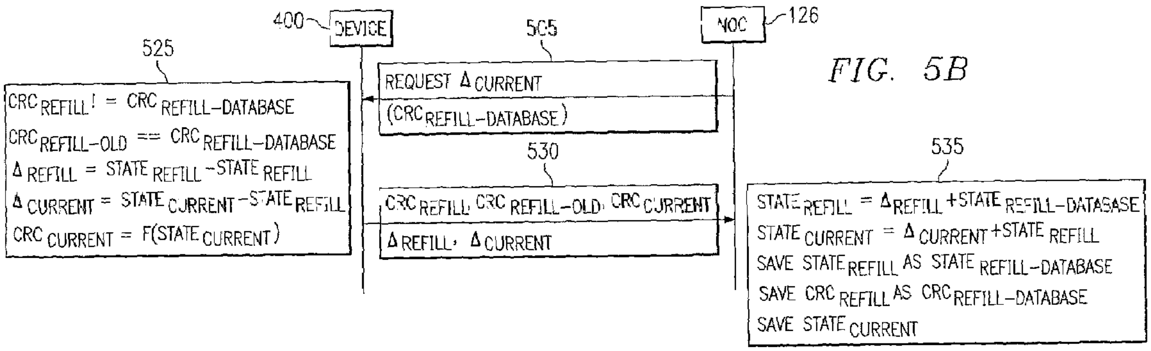
Figure 5C:
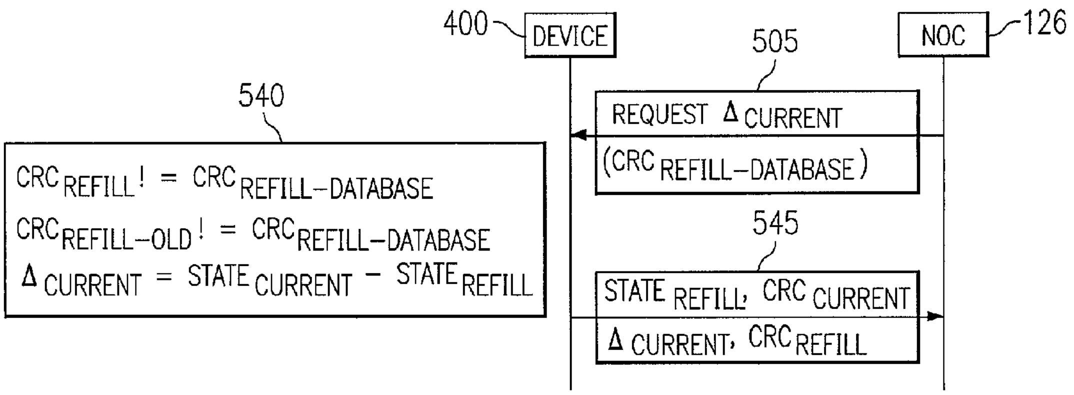

FIGS. 5A–5C illustrate the processing which can occur in response to a getStructuredDexData request for the $\Delta_{Current}$ of device 400. FIG. 5A illustrates one embodiment of the preferred steps that occur when updating database 230 with the changes which have occurred at device 400 since database 230 was last updated. As indicated at 505, to update database 230 with the current changes that have occurred at remote device 400, NOC 126 sends a getStructuredDexData request for $\Delta_{Current}$ to device 400. Included in the getStructuredDexData request for $\Delta_{Current}$ is error checking value $CRC_{Refill\text{-}Database}$. Upon receipt of the $\Delta_{Current}$ request and the $CRC_{Refill\text{-}Database}$ value, device 400 performs the steps indicated at 510. Device 400 begins by comparing the value of $CRC_{Refill\text{-}Database}$ provided by NOC 126 to a value of $CRC_{Refill}$ accessible by device 400. A comparison of the values of $CRC_{Refill\text{-}Database}$ and $CRC_{Refill}$ is performed to verify that NOC 126 and database 230 have the most current value for $State_{Refill}$ of device 400. If the values of $CRC_{Refill\text{-}Database}$ and $CRC_{Refill}$ are found to be equivalent, device 400 can then calculate $\Delta_{Current}$ by subtracting $State_{Refill}$ from $State_{Current}$ using a previously restructured data block or by restructuring a data block before calculating $\Delta_{Current}$. Device 400 will also preferably calculate a $CRC_{Current}$ value by applying a CRC function to $State_{Current}$. Once device 400 has completed all of the processing steps necessary to provide NOC 126 with the information requested, $CRC_{Current}$ and $\Delta_{Current}$ are written to a device response and transmitted to NOC 126 for processing as indicated at 515. The current state of device 400, the CRC calculated as well as other variables are stored by device 400 as previous state information for use with the next getStructuredDexData request once the device response has been transmitted.

Upon receipt of $CRC_{Current}$ and $\Delta_{Current}$ by NOC 126, database 230 is updated to reflect the current state of device 400. As indicated at 520, to update database 230, $\Delta_{Current}$ is added to the value of $State_{Refill\text{-}Database}$ stored in database 230 to recreate $State_{Current}$ or the current state of device 400. Once $State_{Current}$ has been stored, database 230 will then contain the current state of device 400. This updated information can be used to issue service calls, page a distributor to replenish inventory, or perform a myriad of other functions.

FIG. 5B illustrates the processing which preferably occurs when $CRC_{Refill\text{-}Database}$ is compared to the value of $CRC_{Refill}$, during the processing of a getStructuredDexData request for $\Delta_{Current}$ by device 400, and the two are not equal. As indicated at 525, an attempt by device 400 to interpret the value of $CRC_{Refill\text{-}Database}$ provided is made by comparing the value of $CRC_{Refill\text{-}Database}$ against the value of $CRC_{Refill\text{-}Old}$ that is available to device 400. If the value of $CRC_{Refill\text{-}Database}$ matches the value of $CRC_{Refill\text{-}Old}$, this indicates that the value of $CRC_{Refill\text{-}Database}$ provided by NOC 126 represents an older $State_{Refill}$ at NOC 126 than the latest $State_{Refill}$ transmitted by device 400. In such a situation, device 400 preferably provides $\Delta_{Current}$ and $\Delta_{Refill}$ to NOC 126 in order to update their corresponding values in database 230. As indicated at 525, $\Delta_{Refill}$ is calculated by subtracting $State_{Refill\text{-}Old}$ from $State_{Refill}$. $\Delta_{Current}$ is calculated as described above.

Once $\Delta_{Current}$ and $\Delta_{Refill}$ have been calculated, a device response is written, preferably using compressed data, and the update information is then transmitted to NOC 126. As indicated at 530, the information preferred to properly update database 230 includes $\Delta_{Current}$, $\Delta_{Refill}$, $CRC_{Refill}$, $CRC_{Refill\text{-}Old}$ and $CRC_{Current}$. Upon receipt of $\Delta_{Current}$, $\Delta_{Refill}$, $CRC_{Refill}$, $CRC_{Refill\text{-}Old}$ and $CRC_{Current}$ by NOC 126, database 230 is updated. As indicated at 535, the current refill state or $State_{Refill}$ of device 400 is calculated by adding $\Delta_{Refill}$ to $State_{Refill\text{-}Database}$ at NOC 126. The $State_{Refill}$ value is then stored as an updated $State_{Refill\text{-}Database}$ value. The current state or $State_{Current}$ of device 400 is recreated by adding $\Delta_{Current}$ to $State_{Refill}$. The new $State_{Current}$ value is then stored in database 230. Each CRC check value is also preferably stored in database 230 to update the check values each represents.

If device 400 determines that the value of $CRC_{Refill\text{-}Database}$ does not equal the value of $CRC_{Refill}$ or $CRC_{Refill\text{-}Old}$, device 400 preferably transmits the complete $State_{Refill}$ and $\Delta_{Current}$ based on the current state of device 400. As illustrated at 540 of FIG. 5C, $\Delta_{Current}$ is calculated by subtracting $State_{Refill}$ from $State_{Current}$. Once $\Delta_{Current}$ has been calculated, device 400 transmits $\Delta_{Current}$, $State_{Refill}$, $CRC_{Current}$ and $CRC_{Refill}$ in a device response to NOC 126, as indicated at 545. Upon receipt, NOC 126 recreates and updates the appropriate variables stored in database 230.

To obtain the refill state or $State_{Refill}$ from device 400, NOC 126 may transmit a getStructuredDexData indicating such a request. As illustrated at 605 of FIG. 6, a request for a $State_{Refill}$ update includes the transmission of $CRC_{Refill\text{-}Database}$. Similar to the request for the $State_{Current}$ update of FIG. 4, device 400 preferably does not compare the value of $CRC_{Refill\text{-}Database}$ to any local CRC values. As indicated at 610, device 400 transmits $CRC_{Refill}$ and $State_{Refill}$ to NOC 126 in response to the request for a $State_{Refill}$ update. Upon receipt of the device response containing the $State_{Refill}$ update, NOC 126 recreates the current state of device 400 based upon values stored in database 230 and the values of $CRC_{Refill}$ and $State_{Refill}$. Database 230 is then updated accordingly.

Figure 7A:
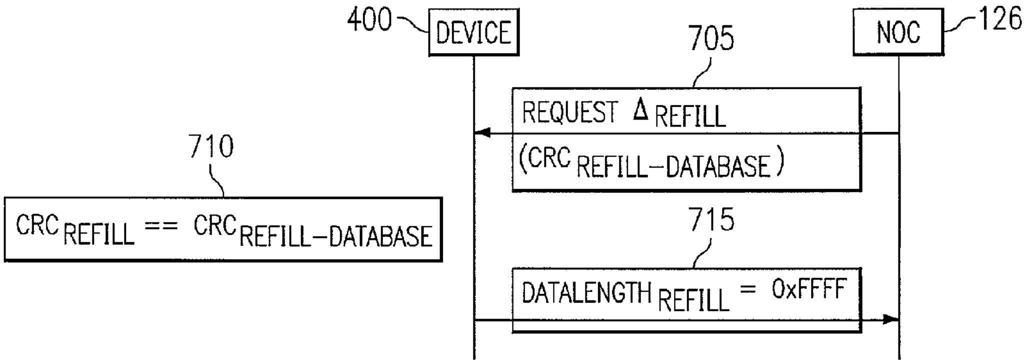
Figure 7B:
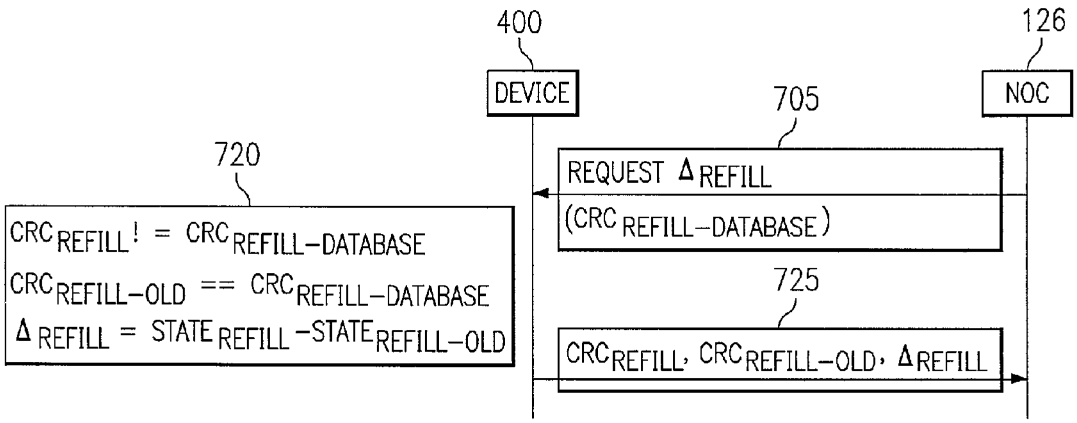
Figure 7C:
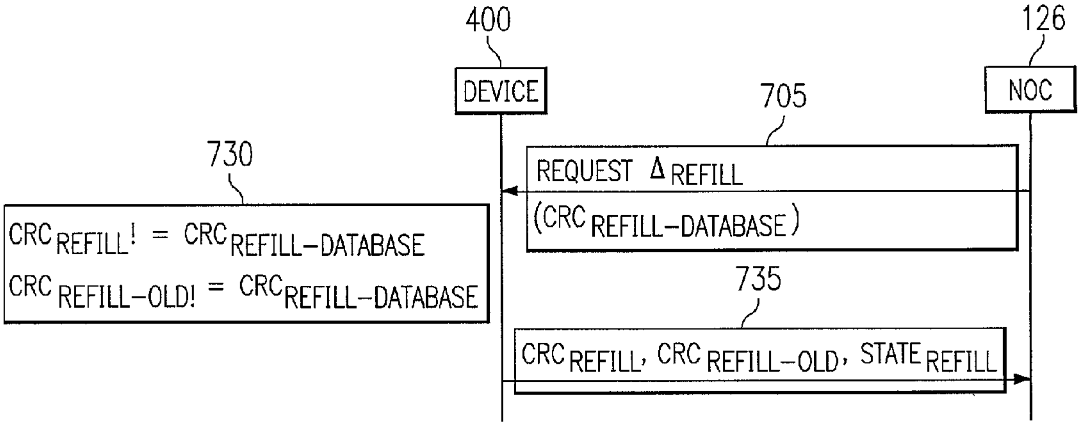

Illustrated in FIGS. 7A–7C is the processing and transmissions which occur when NOC 126 transmits a getStructuredDexData request for $\Delta_{Refill}$ to device 400. As indicated at 705, transmitting a getStructuredDexData request for $\Delta_{Refill}$ preferably includes transmitting $CRC_{Refill\text{-}Database}$ to device 400 from NOC 126. Upon receipt of the getStructuredDexData request for $\Delta_{Refill}$, device 400 uses the $CRC_{Refill\text{-}Database}$ value supplied to verify that NOC 126 has the most current refill state or $State_{Refill}$ for device 400. If the value of $CRC_{Refill\text{-}Database}$ matches the value of $CRC_{Refill}$ when compared, as illustrated at 710, device 400 can then transmit the information requested by NOC 126 in a device response. If the $State_{Refill}$ of device 400 has not changed since the last time device 400 updated database 230, device 400 transmits a $DataLength_{Refill}$ value equal to "FFFF," as indicated at 715, to NOC 126 to indicate that no change has occurred.

If device 400 compares the value of $CRC_{Refill\text{-}Database}$ to the value of $CRC_{Refill}$ and determines the values to not be equal, as indicated at 720 of FIG. 7B, device 400 will then compare the value of $CRC_{Refill\text{-}Database}$ to the value of $CRC_{Refill\text{-}Old}$. If the value of $CRC_{Refill\text{-}Old}$ matches the value of $CRC_{Refill\text{-}Database}$, indicating that the $State_{Refill}$ of device 400 has indeed changed since database 230 was last updated, $\Delta_{Refill}$ is calculated by subtracting $State_{Refill\text{-}Old}$ from $State_{Refill}$. $\Delta_{Refill}$ is then written to a device response and transmitted to NOC 126. In addition to $\Delta_{Refill}$, $CRC_{Refill}$ and $CRC_{Refill\text{-}Old}$ are also transmitted to NOC 126 in the device response as indicated at 725.

Should device 400 determine that the value of $CRC_{Refill\text{-}Database}$ transmitted by NOC 126 does not equal the value of $CRC_{Refill}$ or the value of $CRC_{Refill\text{-}Old}$, as indicated at 730 of FIG. 7C, device 400 will then transmit $State_{Refill}$ to NOC 126. In addition to $State_{Refill}$, device 400 transmits $CRC_{Refill}$ and $CRC_{Refill\text{-}Old}$ to NOC 126 as indicated at 735 such that database 230 can be updated accordingly.

Figure 8:
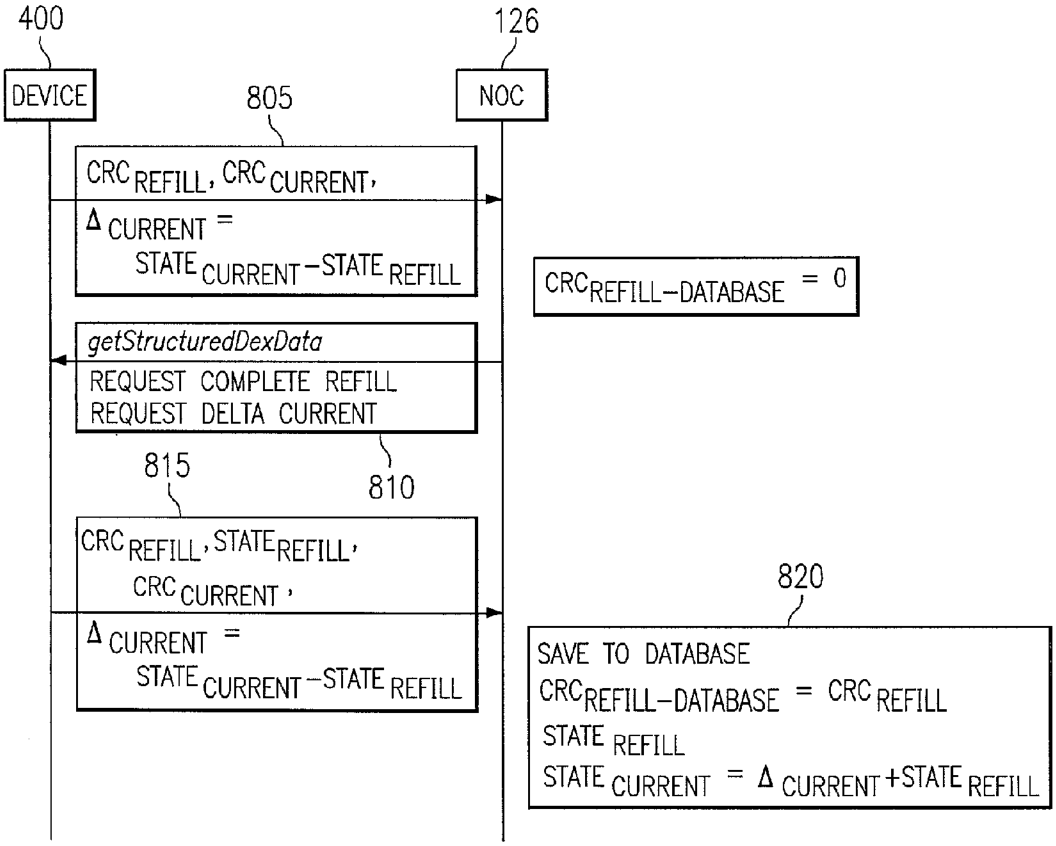

FIG. 8 illustrates one method of adding a new device to database 230. As illustrated at 805 of FIG. 8, device 400 transmits unsolicited state information to NOC 126, i.e. in an automated or "Call-In" operating environment. Information included in an unsolicited transmission from a newly added device 400 might include $CRC_{Refill}$, $CRC_{Current}$, and $\Delta_{Current}$. The $\Delta_{Current}$ transmitted by device 400 is calculated by subtracting $State_{Refill}$ from $State_{Current}$.

Upon receipt of the unsolicited transmission indicated at 805, NOC 126 begins processing by comparing the value of $CRC_{Refill}$ provided by newly added device 400 with the value of $CRC_{Refill\text{-}Database}$ in database 230 for device 400. Since, in this scenario, device 400 is new to the system, the value of $CRC_{Refill\text{-}Database}$ will be empty or zero (0). After determining that device 400 has recently been added to the system, NOC 126 transmits a getStructuredDexData request to device 400 as indicated at 810. In the getStructuredDexData request sent at 810, NOC 126 requests both $State_{Refill}$ and $\Delta_{Current}$ from device 400.

Device 400 responds to the receipt of the getStructuredDexData request from NOC 126 by transmitting the information requested. As indicated at 815, information included in a getStructuredDexData request for $State_{Refill}$ and $\Delta_{Current}$ preferably includes $CRC_{Refill}$, $CRC_{Current}$, $State_{Refill}$ and $\Delta_{Current}$.

Once NOC 126 receives the information requested, database 230 can then be updated as indicated at 820. Database 230 updates the value of $CRC_{Refill-Database}$ by setting its value equal to the value of $CRC_{Refill}$ received. $State_{Refill}$ is also stored in database 230. The value of $State_{Current}$ in database 230 is created by summing $\Delta_{Current}$ and $State_{Refill}$.

An alternative to the method of FIG. 8 for adding a new device to the system involves scheduling NOC 126 to transmit a getStructuredDexData request for $State_{Refill}$ and $\Delta_{Current}$ immediately after a new device is brought online. This proactive approach would eliminate the transmission which occurs at 805 of FIG. 8 leaving only the processes and transmissions indicated at 810, 815 and 820.

Figure 9A:
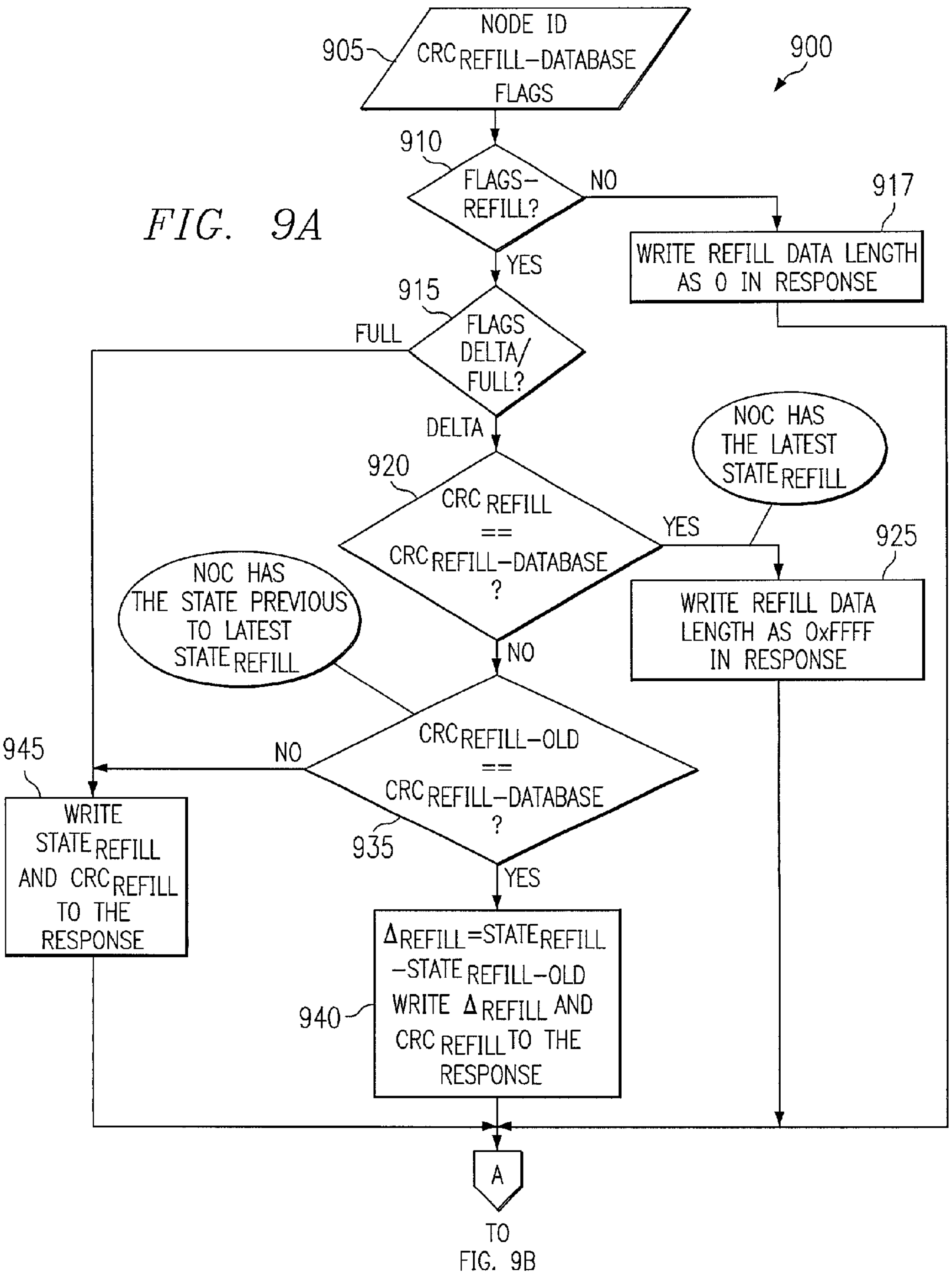
FIGS. 9A–9B is a flow chart illustrating one example of preferred processing performed by a remote device according to one embodiment of the present invention.
Figure 9B:
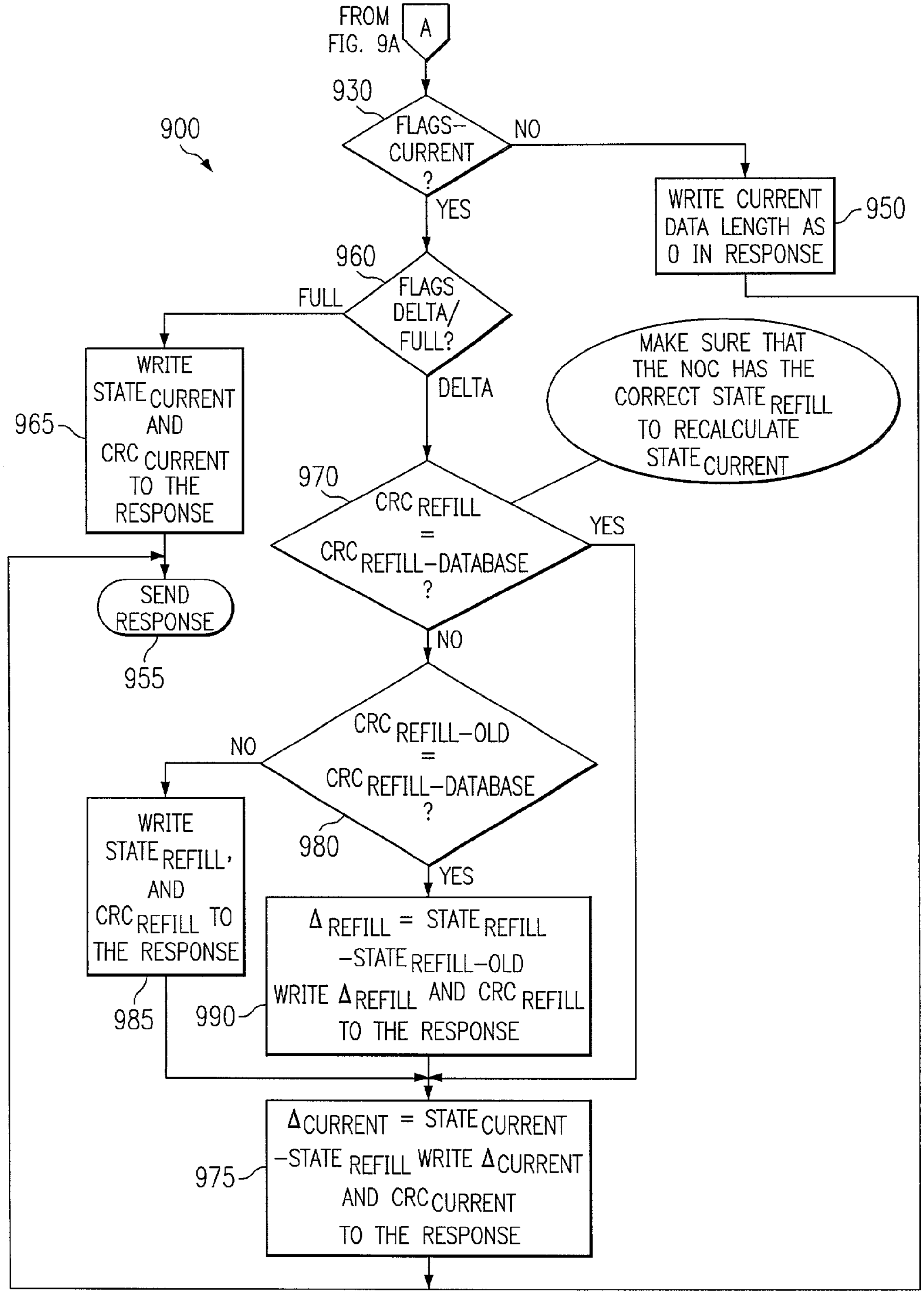

FIGS. 9A–9B illustrates a flow chart indicating the preferred processing performed by device 400 upon receipt from NOC 126 or upon the automated execution of a getStructuredDexData request. Each of the scenarios encountered by device 400 in FIGS. 4–8 are generally processed according to method 900 of FIGS. 9A–9B.

Persons having ordinary skills in the art can appreciate the changes to FIGS. 4–9 which occur in a "Call-In" mode of generation. Upon receipt of the getStructuredDexData request from NOC 126, any information, such as return Node ID, $CRC_{Refill-Database}$, and flag information, included in the getStructuredDexData request is extracted, as indicated at step 905. Once the information has been extracted, the flag information is evaluated to determine if the getStructuredDexData request includes a request for the Refill-data information of device 400. If it is determined, at step 910, that the getStructuredDexData request includes a request for the Refill-data of device 400, method 900 proceeds to step 915 to determine if the Refill-data request is a request for the $State_{Refill}$ or a request for the $\Delta_{Refill}$ of device 400. Alternatively, if at step 910 it is determined that the getStructuredDexData request received from NOC 126 does not include a request for the Refill-data of device 400, method 900 proceeds to step 917 where a $DataLength_{Refill}$ value equal to zero (0) is written to the device response. In a preferred embodiment of the present invention, data is compressed before being written to a device response.

At step 915, if it is determined that the getStructuredDexData request includes a request for $\Delta_{Refill}$, method 900 proceeds to step 920 for a comparison of the $CRC_{Refill}$ value of device 400 with the value of $CRC_{Refill-Database}$ provided by NOC 126. If the value of $CRC_{Refill}$ is equal to the value of $CRC_{Refill-Database}$, method 900 proceeds to step 925 where a $DataLength_{Refill}$ value equal to "FFFF" is written in the device response. A $DataLength_{Refill}$ value equal to "FFFF" indicates to NOC 126 that there has been no change in the Refill-data since the last update requested from and transmitted by device 400. Once the device response has been written, method 900 proceeds to step 930.

Alternatively, if at step 920 the value of $CRC_{Refill}$ is determined to be different than the value of $CRC_{Refill-Database}$, method 900 proceeds to step 935. At step 935, the value of $CRC_{Refill-Database}$ is compared to the value of $CRC_{Refill-Old}$. If the value of $CRC_{Refill-Old}$ equals the value of $CRC_{Refill-Database}$, method 900 proceeds to step 940. At step 940, $\Delta_{Refill}$ is calculated by subtracting $State_{Refill-Old}$ from $State_{Refill}$. $\Delta_{Refill}$ is then written into a device response. Additionally, $CRC_{Refill}$ is written in the device response to enable the value of $CRC_{Refill-Database}$ in database 230 to be updated. Upon completion of step 940, method 900 proceeds to step 930.

Should the value of $CRC_{Refill-Old}$ differ from the value of $CRC_{Refill-Database}$, method 900 proceeds from step 935 to step 945. If the value of $CRC_{Refill-Old}$ should differ from the value of $CRC_{Refill-Database}$, database 230 at NOC 126 will require a $State_{Refill}$ update. At step 945, a $State_{Refill}$ and a $CRC_{Refill}$ value are written to a device response. Upon receipt of the device response at NOC 126, database 230 can then be updated with the values of $CRC_{Refill}$ and $State_{Refill}$ provided. Upon completion of step 945, method 900 proceeds to step 930.

At step 930, the flags received in the getStructuredDexData request sent by NOC 126 are evaluated to determine if NOC 126 is requesting Current-data information from device 400. If, at step 930, it is determined that the getStructuredDexData request does not include a request for Current-data, method 900 proceeds to step 950 where a value of zero (0) is written in the device response for Current-data. Once step 950 has been completed, method 900 proceeds to step 955 where the response written by method 900 is transmitted to NOC 126.

Should it be determined at step 930 determine that the getStructuredDexData request includes a request for Current-data from device 400, method 900 proceeds to step 960. At step 960, it is determined whether the getStructuredDexData request includes a request for a $\Delta_{Current}$ update or a request for a $State_{Current}$ update. If a $State_{Current}$ update is requested, method 900 proceeds to step 965 where $State_{Current}$ and $CRC_{Current}$ for device 400 are written a device response. Once $State_{Current}$ and $CRC_{Current}$ have been written to the device response at step 965, method 900 proceeds to step 955 where the device response is transmitted to NOC 126.

If a request for $\Delta_{Current}$ is included in the getStructuredDexData requested sent by NOC 126 as determined at step 960, method 900 proceeds to step 970. $CRC_{Refill}$ is compared to the value of $CRC_{Refill-Database}$ at step 970. If the value of $CRC_{Refill}$ is determined to equal the value of $CRC_{Refill-Database}$ at step 970, method 900 proceeds to step 975. At step 975, $\Delta_{Current}$ is calculated by subtracting $State_{Refill}$ from $State_{Current}$ and written to a device response as is a $CRC_{Current}$ value. Once $\Delta_{Current}$ and $CRC_{Current}$ have been written to the device response, method 900 proceeds to step 955 where the device response is transmitted to NOC 126.

Should it be determined at step 970 that the value of $CRC_{Refill}$ does not equal the value of $CRC_{Refill-Database}$, method 900 proceeds to step 980 where the value of $CRC_{Refill-Old}$ is compared against the value of $CRC_{Refill-Database}$. If the value of $CRC_{Refill-Old}$ is determined to not equal the value of $CRC_{Refill-Database}$ at step 980, $State_{Refill}$ and $CRC_{Refill}$ are written to a device response at step 985. If the value of $CRC_{Refill-Old}$ is determined to equal the value of $CRC_{Refill-Database}$ at step 980, $\Delta_{Refill}$ is calculated by subtracting $State_{Refill-Old}$ from $State_{Refill}$. $\Delta_{Refill}$ is then written to the device response along with $CRC_{Refill}$ at step 990. Upon completion of either step 985 or 990, method 900 proceeds to step 975 for the processing described above and then on to step 955 where the device response is transmitted to NOC 126. Based upon the above descrition, a person having ordinary skill in the art can appreciate the changes to FIGS. 4–9 which occur when device 400 is operated in a "Call-In" mode.

Figure 10A:
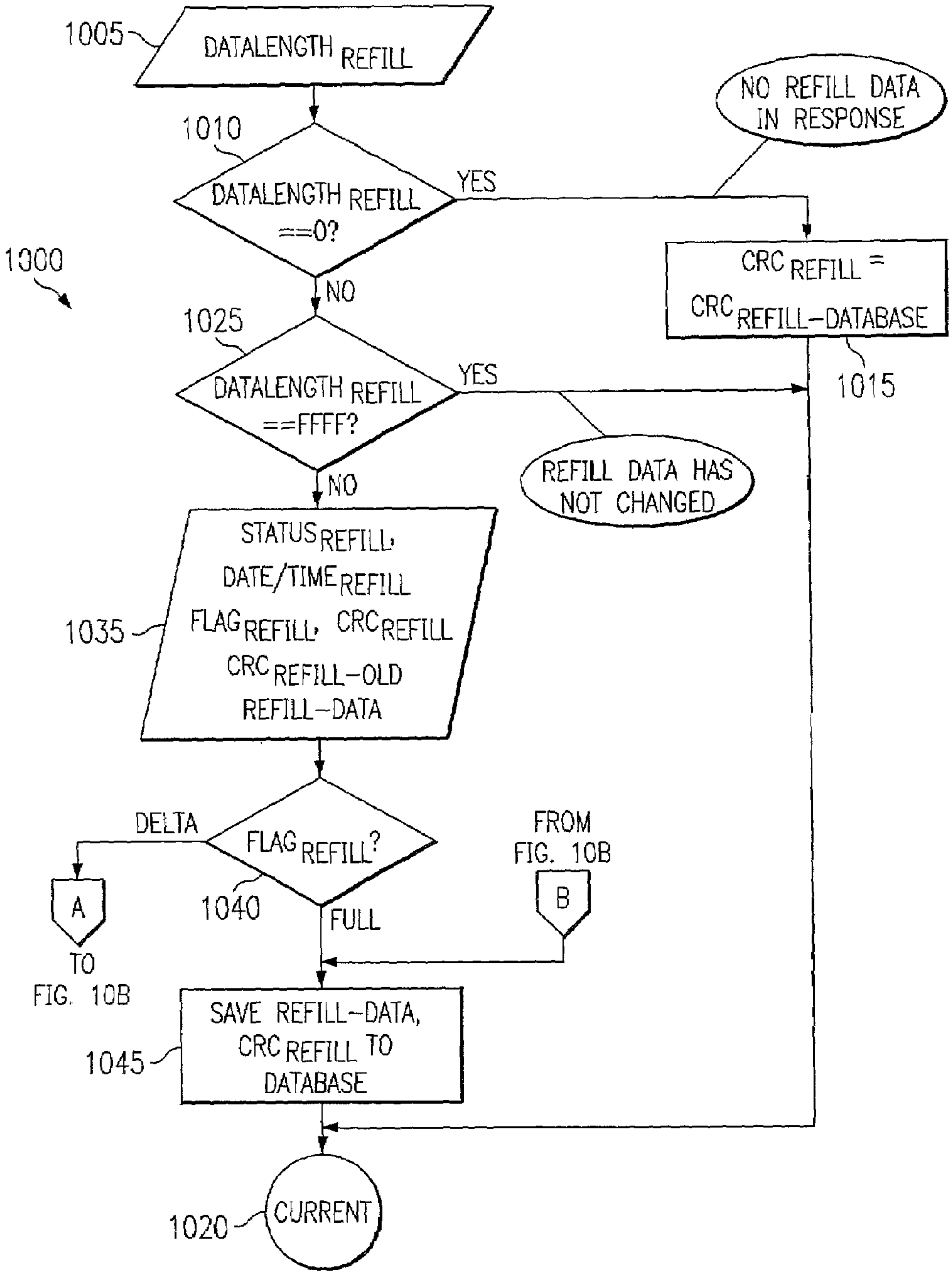
FIGS. 10A–10B is a flow chart illustrating one example of preferred processing performed by a network operations center according to one embodiment of the present invention.
Figure 10B:
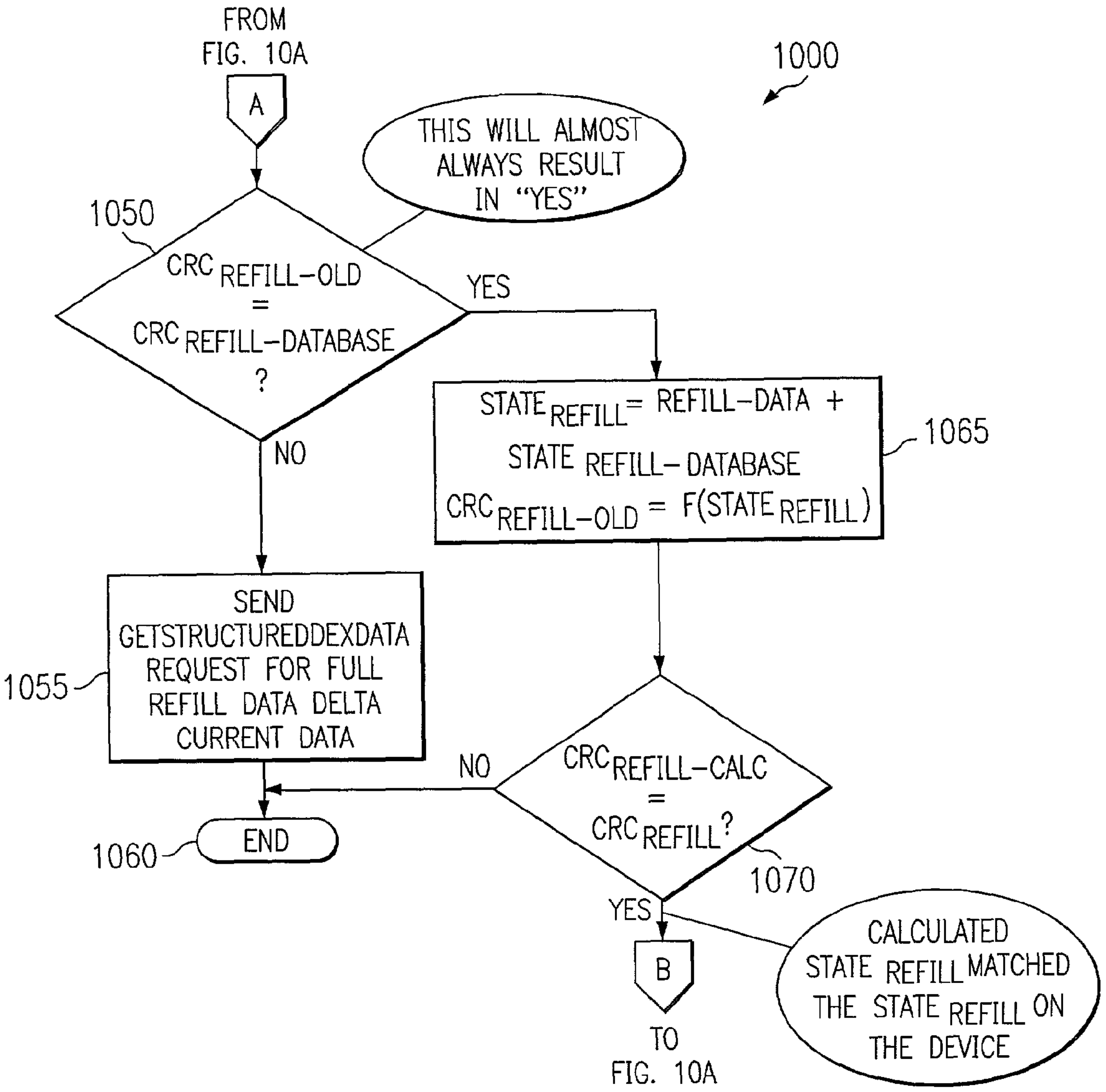

FIGS. 10A–10B illustrates a flow chart indicating the preferred processing performed by NOC 126 upon receipt of the device response created by device 400 in response to a getStructuredDexData request. Each of the scenarios encountered by NOC 126 in FIGS. 4–8 are preferably performed according to method 1000 of FIGS. 10A–10B. Upon receipt of the device response created by method 900, method 1000 preferably begins by extracting, such as uncompressing compressed data, the value of $DataLength_{Refill}$ as indicated at step 1005. Once the value of $DataLength_{Refill}$ has been obtained, method 1000 proceeds to step 1010 where $DataLength_{Refill}$ is compared against a null (0) character. If it is determined at step 1010 that the value of $DataLength_{Refill}$ is equal to the null (0) character, method 1000 proceeds to step 1015 where the value of $CRC_{Refill}$, provided in the device response created by method 900, is stored in database 230 as the value of $CRC_{Refill\text{-}Database}$. As a result, method 1000 is complete and the appropriate values of database 230 have been updated as indicated at 1020.

At step 1010, if it is determined that the value of $DataLength_{Refill}$ is something other than the null (0) character, method 1000 proceeds to step 1025. At step 1025, the value of $DataLength_{Refill}$ is compared to the value "FFFF". If the Refill-data of device 400 has not changed since the last device response transmitted by device 400, the value of $DataLength_{Refill}$ is equal to "FFFF" and method 1000 will then proceed to step 1020.

If, at step 1025, it is determined that the value of $DataLength_{Refill}$ does not equal "FFFF", method 1000 proceeds to step 1035. At step 1035, the values of $StateR_{efill}$, $Date/Time_{Refill}$, $Flag_{Refill}$, $CRC_{Refill}$, $CRC_{Refill\text{-}Old}$ and Refill-data are obtained. Once the desired values have been obtained, $Flag_{Refill}$ is tested at step 1040 to determine whether the Refill-data included in the device response is a $State_{Refill}$ update or $\Delta_{Refill}$ information. If $Flag_{Refill}$ indicates the information included in the device response is for a $State_{Refill}$ update, method 1000 proceeds to step 1045 where the Refill-data information and the value of $CRC_{Refill}$ are stored in database 230. Once the storage is complete, method 1000 proceeds to step 1020 to repeat the method of FIGS. 10A–10B using Current-data vales and variables in place of Refill-data values and variables.

Alternatively, if it is determined at step 1035 that the value of $Flag_{Refill}$ indicates that $\Delta_{Refill}$ information is included in the device response received by NOC 126, method 1000 proceeds to step 1050. At step 1050, the value of $CRC_{Refill\text{-}Old}$ is compared to the value of $CRC_{Refill\text{-}Database}$. If the value of $CRC_{Refill\text{-}Old}$ does not equal the value of $CRC_{Refill\text{-}Database}$, method 1000 proceeds to step 1055 where a getStructuredDexData request for a $State_{Refill}$ update and $\Delta_{Current}$ is preferably generated and subsequently transmitted to device 400 before NOC 126 ends current processing at 1060.

If it is determined that the value of $CRC_{Refill\text{-}Old}$ equals the value of $CRC_{Refill\text{-}Database}$ at step 1050, method 1000 proceeds to step 1065 where $State_{Refill}$ is calculated by summing Refill-Data and $State_{Refill\text{-}Database}$. Also at step 1065, $CRC_{Refill\text{-}Calc}$ is calculated by applying an appropriate CRC function to the value of $State_{Refill}$. Once a value of $CRC_{Refill\text{-}Calc}$ has been calculated, it is compared to the value of $CRC_{Refill}$ at step 1070. The value of $CRC_{Refill\text{-}Calc}$ is compared to the value of $CRC_{Refill}$ to determine if the information included in the device response received can be used to update the information maintained by database 230. If the value of $CRC_{Refill\text{-}Calc}$ does not equal the value of $CRC_{Refill}$, method 1000 proceeds to step 1055 for the processing described above and ends at 1060. If the value of $CRC_{Refill\text{-}Calc}$ equals the value of $CRC_{Refill}$, method 1000 proceeds first to step 1045 database 230 is updated and then on to 1020. Based on the above description, a person having ordinary skills in the art can appreciate the changes to FIGS. 4–10 when device 400 is operating in a "Call-In" mode.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method for communicating information, associated with states of a remote device, between a network operations center and the remote device using a wide area network device and a local area network device comprising:

communicating information associated with the states of the remote device between the network operations center and the remote device using a DEX/UCS protocol for transmitting data, based on an original DEX/UCS data block associated with the states of the remote device;

communicating information associated with the states of the remote device between the network operations center and the remote device using a delta scheme for transmitting data between the wide area network device and the local area network device to reduce the amount of data necessary to provide a complete update of information concerning the remote device stored at the network operations center and an associated database;

storing a previous state of the remote device selected from the group consisting of inventory levels, conditions of device hardware and any other characteristic capable of being monitored and contained in the original DEX/UCS data block stored in the database associated with the network operations center;

transmitting at least one request for information concerning a current state of the remote device from the network operations center to the remote device;

transmitting an error checking cyclic redundancy check value from the network operations center to the at least one remote device as part of the request;

receiving the at least one request by the remote device;

establishing the current state of the remote device selected from the group consisting of inventory levels, conditions of device hardware and any other characteristic capable of being monitored and communicated using the DEX/UCS protocol in response to the at least one request;

selecting records at the remote device based upon the at least one request as specified in a template from the original DEX/UCS data block;

restructuring, at the remote device, the selected records in a preferred order according to the template;

calculating a delta between the restructured records corresponding with the current state of the remote device and a stored set of restructured records corresponding with a previous state of the remote device;

applying a data compression algorithm to the calculated delta;

restructuring of the selected records, based upon the template, allowing higher compression ratios to be achieved when the data compression algorithm is applied to the calculated delta;

preparing a device response at the remote device which includes a current cyclic redundancy check value and the compressed delta, wherein the current cyclic redundancy check value is calculated based on a comparison of the error checking redundancy check value from the network and a cyclic redundancy check value accessible by the remote device; (pages 19–20, spec.)

transmitting the device response to the network operations center;

receiving the device response at the network operations center; and creating a current state of the remote device at the network operations center based on stored values in the associated database, the current cyclic redundancy check value and the compressed delta provided in the device response.

2. The method of claim 1 further comprising evaluating at least one characteristic of the at least one request for information to determine the type of information being requested.

3. The method of claim 1 further comprising writing the restructured records to a device response.

4. The method of claim 1 further comprising:

transmitting at least one check value; and comparing the at least one check value with at least one stored value.

5. The method of claim 1 wherein transmitting is supported by a wireless network.

6. The method of claim 1 wherein transmitting is supported by a wire-line network.

7. The method of claim 1 further comprising:

storing the current state of the remote device as the previous state of the remote device in the database; and storing the previous state of the remote device as a reference state for the remote device in the database.

8. A method for communicating data between a network operations center and at least one remote device comprising:

receiving data from the remote device at the network operations center and transmitting data from the network operations center to the remote device;

processing data received from the remote device at the network operations center and storing the processed data in a database associated with the network operations center;

transmitting a data request for a current state of the at least one remote device from the network operations center to the at least one remote device;

transmitting an error checking cyclic redundancy check value from the network operations center to the at least one remote device as part of the data request;

establishing a current state for the at least one remote device by selecting records from a data block at the remote device indicative of the current state of the remote device;

restructuring the selected records at the remote device, based upon a template, to establish the current state of the remote device;

accessing a previous state for the at least one remote device;

calculating a delta between the current state and the previous state for the at least one remote device;

applying a data compression algorithm to the calculated delta;

restructuring of the selected records, based upon the template, allowing higher compression ratios to be achieved when the data compression algorithm is applied to the calculated delta;

preparing a device response at the remote device which includes a current cyclic redundancy check value and the compressed delta, wherein the current cyclic redundancy check value is calculated based on a comparison of the error checking redundancy check value from the network and a cyclic redundancy check value accessible by the remote device; (pages 19–20, spec.)

transmitting the device response to the network operations center;

receiving the device response at the network operations center; and creating a current state of the remote device at the network operations center based on stored values in the associated database, the current cyclic redundancy check value and the compressed delta provided in the device response.

9. The method of claim 8 further comprising sorting the delta by the remote device.

10. The method of claim 8 wherein selecting records comprises selecting the records from a DEX/UCS data block.

11. The system of claim 8 further comprising the remote device operable to calculate and transmit the delta in response to a predetermined event.

12. A system for communicating data between a network operations center and at least one remote device comprising:

a wide area network operable to communicate data between the network operations center and the remote device;

the network operations center operable to establish communications with the remote device using the wide area network;

the remote device operable to establish communications with the network operations center using the wide area network;

the network operations center operable to process data received from the remote device and to store the processed data in an associated database;

a data block having at least one set of records communicatively coupled to the remote device;

the remote device operable to receive a request for data from the network operations center;

the remote device operable to receive an error checking cyclic redundancy check value from the network operations center as part of the request;

the remote device operable to select records from the data block based on the data request from the network operations center;

a template for restructuring the selected records by the remote device;

the remote device operable to restructure the selected records according to the template;

the remote device operable to calculate a delta between the restructured records and a stored set of records according to the template;

the remote device operable to apply a data compression algorithm to the calculated delta;

the remote device operable to restructure the selected records, based upon the template, allowing higher compression ratios to be achieved when the data compression algorithm is applied to the calculated delta;

the remote device operable to prepare a device response which includes a current cyclic redundancy check value and the compressed delta, wherein the current cyclic redundancy check value is calculated based on a comparison of the error checking redundancy check value from the network and a cyclic redundancy check value accessible by the remote device; (pages 19–20, spec.)

the remote device operable to transmit the device response to the network operations center;

the network operations center operable to receive the device response; and the network operations center operable to create a current state of the remote device based on stored values in the associated database, the current cyclic redundancy check value and the compressed delta provided in the device response.

13. The system of claim 12 wherein that at least one remote device comprise a vending machine.

14. The system of claim 13 further comprising a plurality of vending machines.

* * * * *